United States Patent [19]

Ando et al.

[11] 4,168,867

[45] Sep. 25, 1979

[54] VEHICLE ANTI-SKID BRAKE CONTROL DEVICE

[75] Inventors: Masamoto Ando, Toyota; Katsuki Takayama, Chiryu, both of Japan

[73] Assignee: Aisin Seiki Kabushiki Kaisha, Aichi, Japan

[21] Appl. No.: 850,660

[22] Filed: Nov. 11, 1977

[30] Foreign Application Priority Data

Dec. 3, 1976 [JP] Japan .................. 51-145938

[51] Int. Cl.² .............................................. B60T 13/68
[52] U.S. Cl. ...................................... 303/115; 91/28; 91/31
[58] Field of Search ............... 91/28, 31; 188/273; 303/4, 74, 114, 115

[56] References Cited
U.S. PATENT DOCUMENTS 3,790,228  2/1974  Adahan ........................... 303/115

Primary Examiner—Stephen G. Kunin
Attorney, Agent, or Firm—Oblon, Fisher, Spivak, McClelland & Maier

[57] ABSTRACT

An anti-skid brake control device includes a servo mechanism for controlling pressure reducing operation of the device. The servo mechanism includes a constant pressure chamber connected to an engine intake manifold, a variable pressure chamber alternately connected to atmospheric pressure and vacuum in the engine intake manifold, and a vacuum pressure responsive valve including a flow restriction passage wherein, when the engine vacuum rises above a predetermined level due to engine brake operation, the restriction passage is actuated to restrict the vacuum flow to the variable pressure chamber to gradually carry out the pressure recovering operation of the anti-skid brake applied with the engine brake operation.

4 Claims, 3 Drawing Figures

VEHICLE ANTI-SKID BRAKE CONTROL DEVICE

BACKGROUND OF THE INVENTION

1. Field of the Invention

This invention relates generally to anti-skid brake control systems and more particularly to a servo-motor having a flow restriction means for controlling fluid flow therein.

2. Description of Prior Art

Engine brake operation is frequently applied under anti-skid brake operation. Braking force generated under such jointly applied brake operation naturally increases compared to that of normally applied anti-skid brake operation. Accordingly, such increase in braking force might result in early occurrence of next wheel locking upon brake pressure increasing or recovering period. It should be noted that the braking force generated by the engine brake occupies larger parts of the total braking force particularly upon brake operation on a road having low coefficient of adhesion ($\mu$).

Thus frequency of wheel locking will increase during anti-skid brake operation on the road of low coefficient of adhesion, which will result in both prolongation of braking distance and worse brake operational "feeling".

SUMMARY OF THE INVENTION

It is, therefore, an object of the present invention to improve anti-skid brake efficiency even when the engine brake is jointly applied.

It is another object of the present invention to provide an improved anti-skid brake control device for obviating the above drawbacks.

According to the present invention, there is provided a flow restriction passage between the engine intake manifold and a variable pressure chamber of the anti-skid servo motor for restricting the vacuum flow therebetween in response to vacuum level changes in the engine. The vacuum level in the engine is in substantial proportion to that of engine brake force, and therefore, when the engine brake is applied, the vacuum in the engine is increased accordingly. In connection with this fact, the flow restriction passage is arranged to be actuated to restrict the vacuum flow to the variable chamber when the engine vacuum rises above a predetermined level where the engine brake is applied. This vacuum restriction will cause the pressure increasing stage of the anti-skid operation to be retarded so that the next wheel locking may not frequently reoccur.

BRIEF DESCRIPTION OF THE DRAWINGS

Further details of the present invention as well as many specific advantages of it will be apparent from a detailed consideration of the remainder of this specification, the appended claims and the accompanying drawings in which:

DETAILED DESCRIPTION OF THE INVENTION

Figure 1:
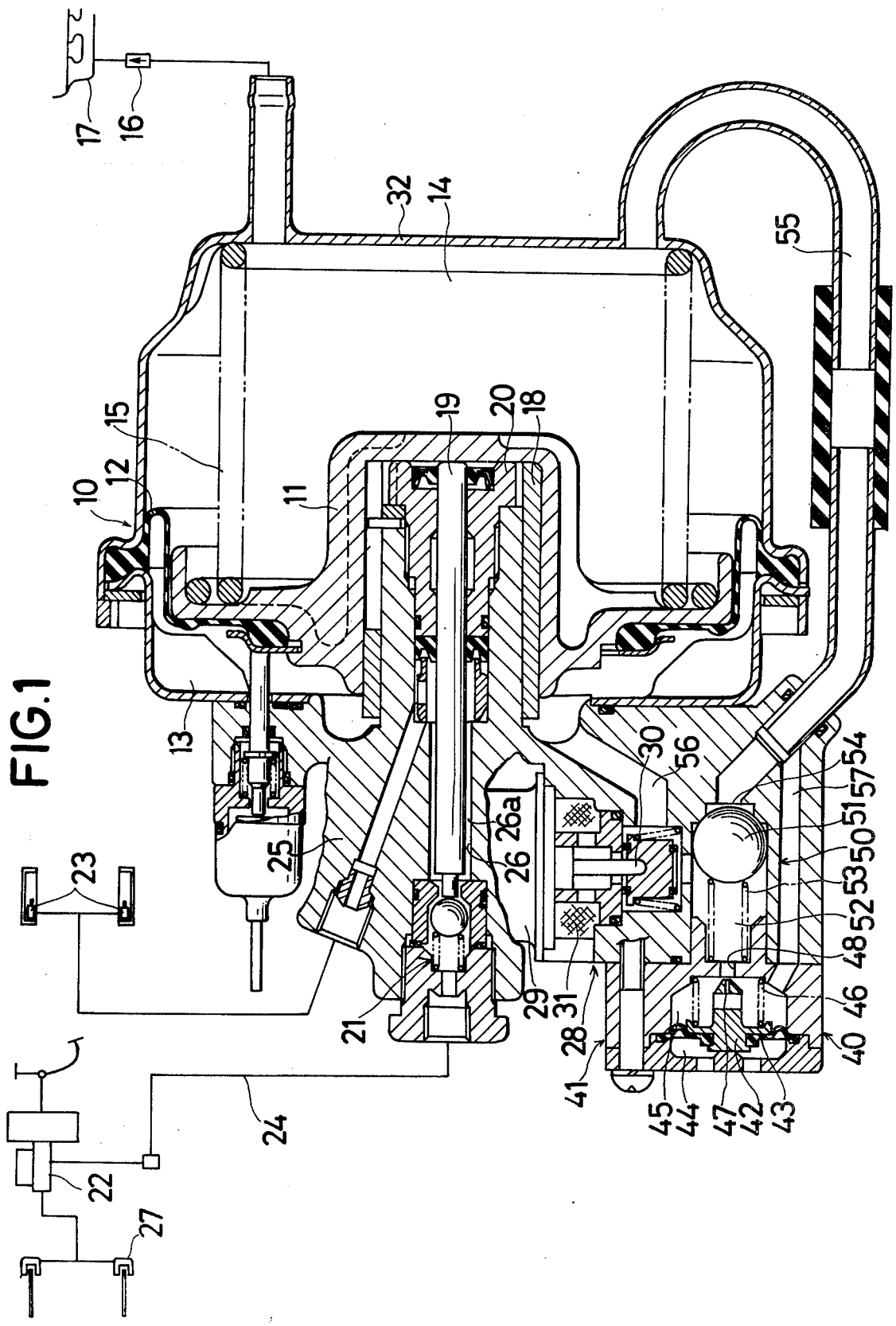
FIG. 1 shows a cross-sectional view of the anti-skid device according to the present invention.

Referring now to the attached drawings, wherein numeral 10 generally designates a servo-motor of an anti-skid brake control device. The servo-motor 10 has a housing 25 including a hydraulic cylinder 26 and a casing 32 secured to the housing 25. The casing 32 is divided into a first and a second chamber 13 and 14 by means of a movable wall including a servopiston 11 and a resilient diaphragm 12 secured thereto. Within the second chamber 14 is disposed a spring 15 for always biasing the movable wall to the left as viewed in FIG. 1. The second chamber 14 is in communication with an engine intake manifold 17 partially shown in FIG. 1 through check valve means 16. The servopiston 11 is slidably guided by a sleeve member 18 secured to the housing 25, while a pressure reducing piston 19 is slidably guided by a plug member 20 secured to one end of the cylinder 26 of the housing 25. The pressure reducing piston 19 is axially movable in the cylinder 26 when the servopiston 11 is moved to be separated from one end, i.e. the right end, of the piston 19.

A cut-off valve means 21 is disposed within the cylinder 26 adjacent to the other end of the pressure reducing piston 19 for cooperation with the movement thereof to cut off fluid communication between a master cylinder 22 and rear wheel brake means 23. A pressure reducing chamber 26a is provided within the cylinder 26 between the cut-off valve means 21 and the rear wheel brake means 23. The volume in the chamber 26a is variable in response to the axial displacement of the pressure reducing piston 19 one portion thereof being exposed to the chamber 26a.

Front wheel brake means 27 are directly connected to the master cylinder 22.

An electro-magnetic change over valve means 28 is provided on the housing 25 and includes solenoid 29 which is energized or deenergized in response to electric signals from computer means (not shown). When the solenoid 29 is energized (which occurs when either one or both rear wheels are locked or being locked during brake operation) in response to a pressure reducing signal from the computer means, piston rod 30 moves downward to introduce atmospheric pressure into the first chamber 13 via air filter 31 and passage 56. Simultaneously the vacuum flow from the second chamber 14 through passage 55 into the first chamber 13 is prevented.

A vacuum pressure responsive valve means 40 is provided on the housing 25 and includes a valve housing 41 secured to the housing 25, a valve piston 42 with diaphragm member 43 movably disposed within the valve housing 41 dividing the same into two chambers 44 and 45, and a spring disposed in one chamber 45 normally biasing the valve piston 42 toward the left. The other chamber 44 is open to the atmospheric pressure. The valve means 40 further includes an orifice passage 47 provided on the valve piston 42 within the chamber 45. The orifice passage 47 communicates with a comparatively larger orifice passage 48 which communicates with a chamber 52 of a deceleration responsive valve means 50. The deceleration responsive valve means 50 is disposed within the vacuum passage 55 and includes a so-called G ball 51 responsive to the vehicle deceleration and rotatably disposed in the chamber 52 which is normally open to the chamber 45 of the vacuum pressure responsive valve means 40 through the orifice passage 48, a spring 53 which is provided in the chamber 52 for biasing the G ball 51 toward the right to interrupt vacuum inlet port 54. The inlet port 54 is opened to introduce vacuum from the second chamber 14 into the first chamber 13 when the G ball is rotated to be separated from the port 54 in response to the vehicle deceleration. A bypass passage 57 is provided between the vacuum passage 55 and the chamber 45 of the valve means 40 for normally communicating vacuum in the second chamber 14 with the first chamber 13 through chamber 45, orifice passage 48, chamber 52 and passage 56.

In operation, when the brake is applied and a rear wheel(s) is locked due to excess braking force, the solenoid 29 is energized to introduce air into the first chamber 13 thereby to move the servopiston 11 to the right. Due to the rightward movement of the servopiston 11, the pressure reducing piston 19 is moved to the right to increase the capacity of pressure reducing chamber 26a. Simultaneously, the cut-off valve means 21 is actuated to prevent the brake pressure supply into the pressure reducing chamber 26a. Thus the brake pressure in the rear wheel brake means 23 is reduced to prevent the corresponding wheel(s) from locking. When the solenoid 29 is deenergized thereafter, the first chamber 13 is prevented from air flow to again permit vacuum communication between the two chambers 13 and 14 to thereby return the movable wall by the spring 15. When the brake is applied during the vehicle running on the road having a high coefficient of adhesion μ, such pressure recovering operation may be promptly carried out, since the vehicle deceleration is sufficiently great enough to rotate or shift the G ball 51 to be separated from the inlet port 54, and thus to allow larger volume of vacuum to be introduced therethrough to the first chamber 13. This relationship is illustrated at the line A in FIG. 2.

On the contrary, when the brake is applied during the vehicle running on the road having a low coefficient of adhesion μ, if the engine brake is not applied the pressure recovering operation may be carried out in accordance with the vacuum level change in the first chamber 13 which communicates with the second chamber 14 through passages 55, 57, chamber 45, orifice passage 48 and passage 56. This relationship is illustrated at the line B in FIG. 2. In more detail, since the engine brake is not applied, the vacuum in the engine intake manifold 17 is relatively low as is shown in FIG. 3. Therefore, the valve piston 42 is positioned to be separated from the larger orifice passage 48 due to the low vacuum level in the chamber 45.

Figure 2:
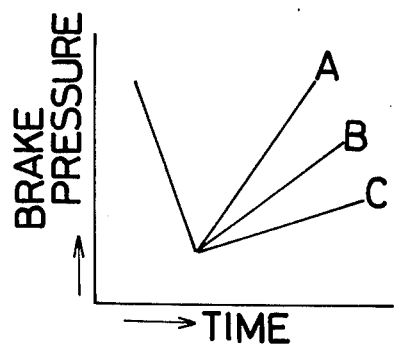
FIG. 2 is a graph showing characteristics of the anti-skid brake controlling operation of FIG. 1.
Figure 3:
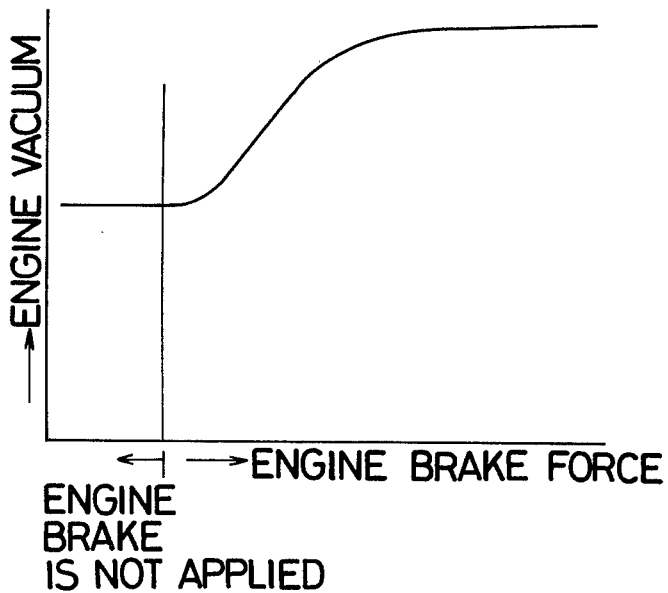
FIG. 3 is a graph showing the mutual relationship between engine brake force and engine vacuum.

However, when the brake is applied jointly with the engine brake on the road having low coefficient of adhesion, the pressure recovering operation may be carried out gradually as is shown at the line C in FIG. 2. This is because the engine vacuum during the engine brake operation is relatively high (as shown in FIG. 3), which will move the valve piston 42 to close the larger orifice passage 28 due to the pressure difference between the chambers 44 and 45. Therefore, the vacuum flow to the first chamber 13 is made only through the small orifice passage 47.

In accordance with the present invention, pressure recovering of the anti-skid brake operation joined by the engine brake will be carried out gradually particularly under the operation of low coefficient of adhesion on the road.

It is to be understood that various modifications can be made without departing from the scope of the invention, and it is intended to cover in the appended claims all such modifications as fall within the true spirit and the scope of the invention.

What is claimed is:

1. A anti-skid brake control device comprising:
cut-off valve means disposed between hydraulic pressure supply means and wheel brake cylinder means for interrupting fluid communication therebetween;
pressure reducing means including a pressure reducing chamber disposed between said cut-off valve means and said wheel brake cylinder means for reducing the pressure in the latter and a pressure reducing piston one portion thereof being exposed to said pressure reducing chamber and operable for increasing the capacity thereof in cooperation with said cut-off valve means;
a servo motor for controlling the operation of said pressure reducing means and including a first constant pressure chamber in communication with an engine vacuum source, a second variable pressure chamber alternately communicating with said engine vacuum source and atmospheric pressure and a movable wall for actuating said pressure reducing piston in response to a pressure difference between said first and second chambers; and
a vacuum pressure responsive valve means disposed within a passage between said engine vacuum source and said second variable chamber for controlling vacuum flow therethrough, said vacuum pressure responsive valve means including flow restriction means which restricts vacuum flow to said variable chamber in response to vacuum level in said engine vacuum source, wherein said engine vacuum source is an engine intake manifold, the vacuum level therein being variable in response to engine operational conditions and wherein said vacuum pressure responsive valve means includes a first chamber open to atmospheric pressure, a second vacuum chamber exposed to said engine vacuum source and a valve piston disposed between said air and vacuum chambers for actuating said flow restriction means in response to pressure difference therebetween.

2. An anti-skid brake control device as set forth in claim 1 wherein said first chamber is continuously open to atmospheric pressure.

3. An anti-skid brake control device comprising:
cut-off valve means disposed between hydraulic pressure supply means and wheel brake cylinder means for interrupting fluid communication therebetween;
pressure reducing means including a pressure reducing chamber disposed between said cut-off valve means and said wheel brake cylinder means for reducing the pressure in the latter and a pressure reducing piston one portion thereof being exposed to said pressure reducing chamber and operable for increasing the capacity thereof in cooperation with said cut-off valve means;
a servo motor for controlling the operation of said pressure reducing means and including a first constant pressure chamber in communication with an engine vacuum source, a second variable pressure chamber alternately communicating with said engine vacuum source and atmospheric pressure and a movable wall for actuating said pressure reducing piston in response to pressure difference between said first and second chambers; and
a vacuum pressure responsive valve means disposed within a passage between said engine vacuum source and said second variable chamber for controlling vacuum flow therethrough, said vacuum pressure responsive valve means including flow restriction means which restricts vacuum flow to said variable chamber in response to vacuum level in said engine vacuum source, wherein said engine vacuum source is an engine intake manifold, the vacuum level therein being variable in response to engine operational conditions, said vacuum pressure responsive means including a first air chamber opened to the atmospheric pressure, a second vacuum chamber exposed to said engine vacuum source and a valve piston disposed between said air and vacuum chamber for actuating said flow or restriction means in response to pressure difference therebetween and wherein said flow restriction means includes a larger orifice passage which allows vacuum flow to said second variable pressure chamber when the vacuum in said engine intake manifold decreases below a determined value and a valve member which closes said larger orifice passage and allows vacuum flow to said second variable pressure chamber only through a smaller orifice passage provided on said valve member when the vacuum level in said engine intake manifold exceeds said predetermined value.

4. An anti-skid brake control device according to claim 3, wherein said valve member of said flow restriction means is formed integral with said valve piston and is actuated by the movement thereof in response to pressure difference between said air and vacuum chambers.

* * * * *